United States Patent
Conrads et al.

(10) Patent No.: US 8,601,957 B2
(45) Date of Patent: Dec. 10, 2013

(54) DEVICE AND METHOD FOR CONTROLLING THE FUEL-AIR RATIO DURING THE COMBUSTION OF GROUND COAL IN THE FIRING SYSTEM OF A COAL POWER PLANT

(75) Inventors: Hans George Conrads, Hannover (DE); Alexander Halm, Hohenwarthe (DE)

(73) Assignee: Promecon Prozess-und Messtechnik Conrads GmbH, Barleben (DE)

( * ) Notice: Subject to any disclaimer, the term of this patent is extended or adjusted under 35 U.S.C. 154(b) by 408 days.

(21) Appl. No.: 13/000,427

(22) PCT Filed: Jun. 24, 2009

(86) PCT No.: PCT/DE2009/000875
§ 371 (c)(1),
(2), (4) Date: Dec. 21, 2010

(87) PCT Pub. No.: WO2009/155903
PCT Pub. Date: Dec. 30, 2009

(65) Prior Publication Data
US 2011/0100271 A1 May 5, 2011

(30) Foreign Application Priority Data
Jun. 27, 2008 (DE) .......................... 10 2008 030 650

(51) Int. Cl.
*F23K 3/02* (2006.01)
*F23N 5/18* (2006.01)
*F23L 15/00* (2006.01)

(52) U.S. Cl.
USPC .... 110/188; 110/104 R; 110/106; 110/165 A; 110/192; 110/232; 110/302; 110/348

(58) Field of Classification Search
USPC .......... 110/104 R, 106, 165 A, 188, 192, 232, 110/302, 348
See application file for complete search history.

(56) References Cited

U.S. PATENT DOCUMENTS

| 3,117,538 | A | | 1/1964 | Baver et al. |
| 3,274,961 | A | | 9/1966 | Wiechard et al. |
| 3,813,939 | A | | 6/1974 | Head |
| 4,512,200 | A | * | 4/1985 | Ghering et al. ............ 73/861.04 |
| 5,591,895 | A | | 1/1997 | Rigby |

FOREIGN PATENT DOCUMENTS

| DE | 20021271 U1 | 4/1985 |
| DE | 69221737 T2 | 2/1998 |

OTHER PUBLICATIONS

International Search Report dated Sep. 23, 2010.

* cited by examiner

*Primary Examiner* — Kenneth Rinehart
*Assistant Examiner* — David J Laux
(74) *Attorney, Agent, or Firm* — Cheryl F. Cohen; Christa Hildebrand

(57) ABSTRACT

A device and method for controlling fuel-air ratio during combustion of ground in a coal power plant, including pneumatic delivery of ground coal to the burners and feeding combustion air to burners while controlling the combustion air and the amount of carrier air. A high reliability of control combined with low maintenance of the air mass measurement devices is achieved. This is achieved by a measurement device for measuring the amount of combustion air which, according to correlation measurement, evaluates the triboelectric effects on sensors. Between 0.1 mg and 10 mg of fine-grained particles of a diameter between 20 μm and 200 μm are introduced per $m^3$ air into suctioned fresh air, which is carried out during the starting of the firing system. This is done by correlation measurement that evaluates triboelectric effects on sensors, arranged in series in carrier air stream in direction of flow of the carrier air.

9 Claims, 2 Drawing Sheets

DEVICE AND METHOD FOR CONTROLLING THE FUEL-AIR RATIO DURING THE COMBUSTION OF GROUND COAL IN THE FIRING SYSTEM OF A COAL POWER PLANT

This is an application filed under 35 USC §371 of PCT/DE2009/000875, claiming priority to DE 10 2008 030 650.9 filed on Jun. 27, 2008.

BACKGROUND OF THE INVENTION (1) Field of the Invention

The invention relates to a device for controlling the fuel-air-ratio during combustion of ground coal in a firing system of a coal-fired power plant, which comprises means for pneumatic delivery of the ground coal to the burners of the coal-fired power plant and means for feeding the combustion air to the burners or the combustion chamber of the firing system of the coal-fired power plant, wherein at least the following devices are arranged in the flow direction of the air: a fresh air blower for suctioning fresh air from the atmosphere, a mill blower for transporting a portion of the suctioned fresh air as carrier air for loading with ground coal, a regenerative air preheater for preheating the suctioned fresh air and a portion of the carrier air by using the flue-gas heat from the firing system of the coal-fired power plant, wherein a storage mass of the regenerative air preheater is alternatingly heated by the hot flue gas and subsequently cooled by the fresh air or by a portion of the carrier air, an air quantity control device for controlling the quantity of combustion air to be used for the pneumatic transport of the ground coal, and measurement devices for measuring the quantity of combustion air introduced into the combustion chamber and of the quantity of carrier air to be used for pneumatic transport of the ground coal, and a device for metered delivery of a preselected quantity of ground coal to the burners. The invention further includes a method for controlling the fuel-a ratio during the combustion of ground coal in a firing system of a coal-fired power plant, which has at least the aforementioned features.

(2) Description of Related Art

The control of the fuel-air ratio during the combustion of ground coal firing systems of coal-fired power plants is particularly important for achieving a substantially complete combustion of the supplied fuel and/or for maintaining a predefined stoichiometry of the combustion process and hence for attaining a high energy efficiency and maintaining low emission values. Firing systems in coal-fired power plants therefore have control devices in addition to suitable devices for metered delivery of a fuel quantity which is preselected in accordance with the load demand, wherein the control devices control the quantity of combustion air supplied to the burners and/or the firing chamber as a function of the supplied fuel quantity. This requires measurement devices capable of measuring the quantity of combustion air introduced into the firing chamber as accurately as possible. Both are necessary for optimally controlling the combustion process depending on the load, wherein the fuel quantity is preselected in accordance with the load demand and the quantity of combustion air is controlled for attaining a predetermined stoichiometry of the combustion. In practice, on one hand, coal-fired power plants exist where a preselected quantity of ground coal is supplied to each individual burner or to a group of burners and the quantity of combustion air supplied to this burner or to this group of burners is controlled commensurate with this preselected quantity of ground coal for obtaining a predetermined stoichiometry of the combustion, and on the other hand, firing systems exist wherein only the total quantity of ground coal supplied to all burners of a boiler room is preselected and the quantity of combustion air supplied to all burners of this boiler or to the overall boiler is controlled commensurately.

It is necessary in any event to measure the quantity of combustion air either in relation to a single burner or a group of burners or all burners of a boiler or the entire boiler, in order control the quantity of combustion air and hence also the combustion process.

In addition, in firing systems of coal-fired power plants with pneumatic transport of the ground coal to the burners, the quantity of carrier air for the pneumatic coal transport is controlled. This control also requires a measurement of the quantity of carrier air.

The quantity of air in firing systems of coal-fired power plants is measured almost exclusively by differential pressure measurements using pressure sensors. To this end, pressure sensors are installed in the respective pipe or channel system carrying the combustion air, as well as in the pipe or channel system carrying the carrier air. Based on the measured pressures, the flow velocity in the channels can be determined and the quantity of air can be determined by taking into account the channel geometry. Preferably, the pressure sensors are not installed directly in the channel cross-section, but are connected with the channels carrying the air via so-called impulse pipes.

For improving the energy efficiency of a firing system of a power plant, the fresh air is typically preheated by alternatingly first heating a storage mass, mostly smooth or corrugated metal sheets, of a regenerative air preheater with hot flue gas and subsequently cooling the storage mass with the fresh air, thereby transferring heat from the flue gas to the fresh air. This is accompanied by the introduction of fly ash particles into the fresh air. During operation of a power plant firing system, this regularly causes contamination of the pressure sensors and/or the impulse pipes, requiring continuous cleaning and maintenance. The problem is that the degree of the contamination of the pressure sensors cannot be uniquely determined based on the measured difference pressures and that the measurement results can therefore have a significant error probability under continuing operation. This causes a drift in the air quantity measurement which is very difficult to detect. In the end, this causes an inaccurate control of the fuel-air ratio, accompanied with a reduced efficiency and increased emission of pollutants.

BRIEF SUMMARY OF THE INVENTION

It is an object of the invention to provide a device and a method for controlling the fuel-air ratio during the combustion of ground coal in a firing system of a coal-fired power plant, which has high reliability and low maintenance costs. It is also an object of the invention to develop a drift-free measurement for the quantity of air in firing systems of coal-fired power plants.

According to the invention, this object is attained with a device according to claim 1 and a method according to claim 8. The claims 2 to 7 depending from claim 1 recite advantageous embodiments of the device of the invention, and the claims 9 to 13 depending from claim 8 recite advantageous embodiments of the method of the invention.

A device according to the invention for controlling the fuel-air ratio during combustion of ground coal in a firing system of a coal-fired power plant, which comprises means for pneumatic transport of the ground coal to the burners of the coal-fired power plant and means for feeding the combustion air to the burners or the combustion chamber of the firing system of the coal-fired power plant, wherein at least the following devices are arranged in the flow direction of the air, a fresh air blower for suctioning fresh air from the atmosphere, a mill blower for transporting a portion of the suctioned fresh air as carrier air for loading with ground coal, a regenerative air preheater for preheating the suctioned fresh air and a portion of the carrier air by using the flue-gas heat from the firing system of the coal-fired power plant, wherein a storage mass of the regenerative air preheater is alternatingly heated by the hot flue gas and subsequently cooled by the fresh air or by a portion of the carrier air, an air quantity control device for controlling the quantity of combustion air to be used for the pneumatic transport of the ground coal, and measurement devices for measuring the quantity of combustion air introduced into the combustion chamber and of the quantity of carrier air to be used for pneumatic transport of the ground coal, and a device for metered feed of a preselected quantity of ground coal to the burners, is characterized in that the quantity of combustion air is measured with a correlation measurement device which evaluates triboelectric effects. For this purpose, at two sensors are disposed in the channel system carrying the combustion air after the regenerative air preheater (5) in the flow direction of the combustion air, which are operatively connected with the correlation measurement device, and at least one device for metered introduction of fine-grained particles into the air flow is disposed before the sensors of the correlation measurement device in the flow direction of the combustion air.

The device for metered introduction of fine-grained particles into the airflow may preferably be arranged before the fresh air blower. However, also feasible is an arrangement of the device for metered introduction of fine-grained particles into the airflow between the fresh air blower and the regenerative air preheater, but also after the regenerative air preheater, however always before the sensors of the correlation measurement device. The device for metered introduction of fine-grained particles into the airflow is sized so that between 0.1 mg and 10 mg, preferably between 0.5 mg and 2 mg, of fine-grained particles per $m^3$ of air are introduced into the airflow. A control device for controlling the device for metered introduction of fine-grained particles into the airflow may be provided, which allows a continuous and/or a discontinuous, periodic operation of the device for metered introduction of fine-grained particles into the airflow.

Preferably, the quantity of carrier air may also be measured with a correlation measurement device that evaluates triboelectric effects. To this end, at least two sequentially positioned sensors for sensing triboelectric effects, which are operatively connected with the correlation measurement device, are arranged in the channel system carrying the carrier air and in the flow direction of the carrier air after the regenerative air preheater.

The device for metered introduction of fine-grained particles into the airflow is preferably constructed as a dust injector, wherein preferably filter ash or fly ash is introduced into the airflow as fine-grained particles.

The method of the invention is characterized in that the quantity of combustion air and preferably also the quantity of carrier air are measured with a correlation measurement method based on the evaluation of triboelectric effects at sensors arranged sequentially in the air flow in the flow direction of the air, and that between 0.1 mg to 10 mg, preferably between 0.5 mg to 2 mg, of fine-grained particles per $m^3$ of air with a particle diameter between 20 μm to 200 μm, preferably between 60 μm to 90 μm, are introduced into the air flow before the sensors.

It has been observed that introduction of between 0.1 mg to 10 mg, preferably between 0.5 mg to 2 mg, of fine-grained particles with the aforementioned particle diameter per $m^3$ of air is sufficient for a measurement. Preferably, filter ash or fly ash is introduced.

Preferably, the fine-grained particles are introduced into the airflow only during the startup phase of the firing system of the coal-fired power plant, i.e., during the pre-aeration phase and the oil or gas firing phase. After ignition of the coal dust combustion, a quantity of ash particles causing sufficient triboelectric effects at the sensors is introduced into the fresh air flow and/or the carrier air flow, so that the quantity of air can be measured according to the correlation measurement method without introduction of additional particles. It has even been observed that a periodic introduction of fine-grained particles with a period duration between 100 ms to 60 s and with an introduction of 0.1 mg to 10 mg fine-grained particles per $m^3$ air during the startup phase is sufficient for a reliable measurement.

The device according to the invention and the method according to the invention allow a generally trouble-free and maintenance free control of the fuel-air ratio during the combustion of ground coal in a firing system of a coal-fired power plant, without encountering the problem due to drift in the air quantity measurement known in the art. With the invention, control of the fuel-air ratio is significantly improved due to the high longtime stability of the accuracy of the air quantity measurement.

The invention will now be described in more detail with reference to an exemplary embodiment.

DETAILED DESCRIPTION OF THE INVENTION

Figure 1:
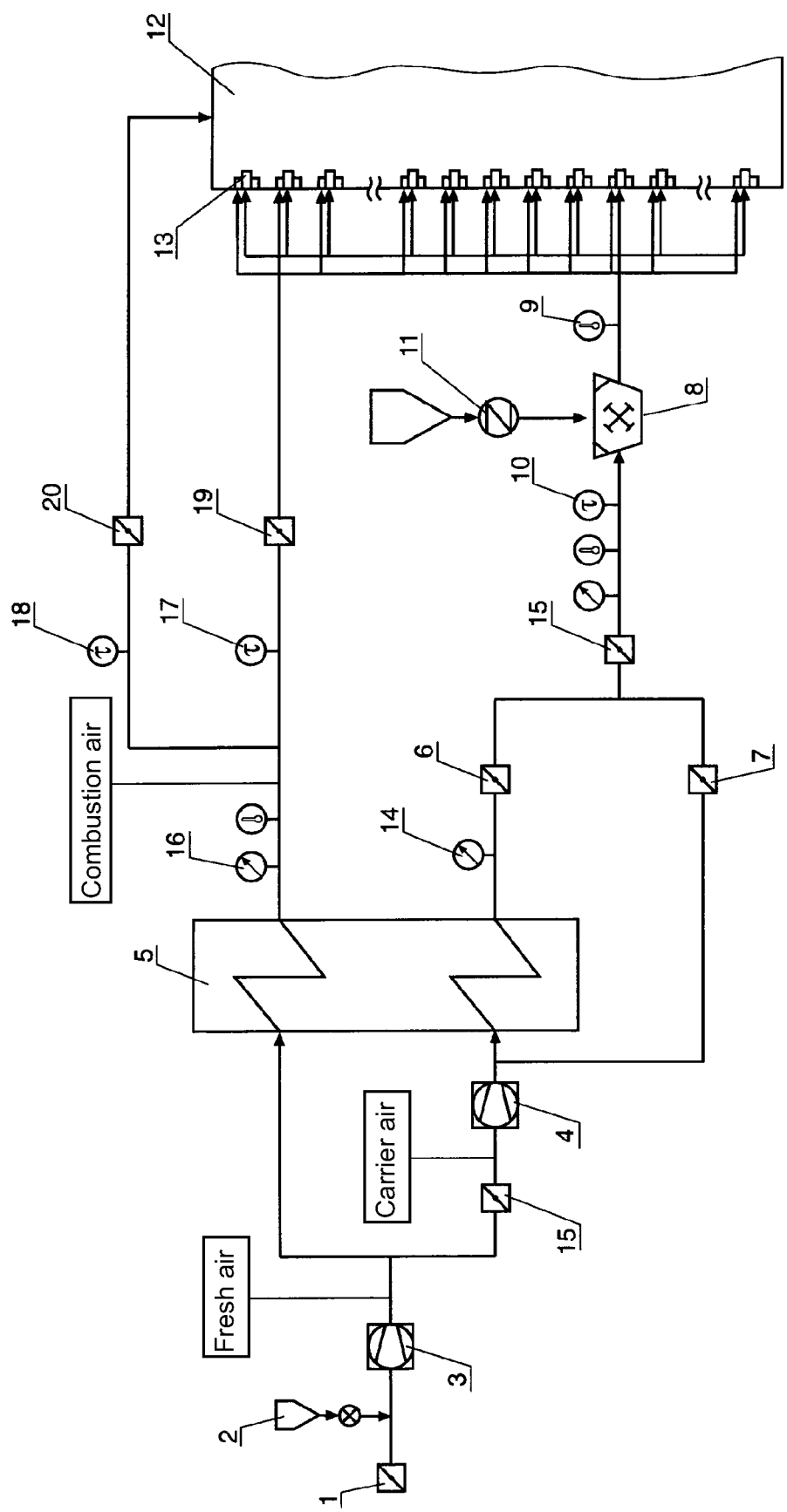
FIG. 1 a simplified schematic diagram of a firing system of a coal-fired power plant, and in FIG. 2 the time dependence of an air quantity measurement in a firing system of a coal-fired power plant.

The simplified schematic diagram of a firing system of a coal-fired power plant shows, beginning with suctioning in of fresh air, a fresh air flap 1, a device 2 for metered introduction of fine-grained particles into the fresh air flow, and a fresh air blower 3. After the fresh air blower 3, the carrier air is diverged from the suctioned fresh air. The carrier air is then transported onward by a mill blower 4, in part to a regenerative air preheater 5. A portion of the carrier air is heated in the regenerative air preheater 5 during the stationary operation of the firing system of a coal-fired power plant. Another portion of the carrier air is transported onward cold. Both portions of the carrier air are combined in a metered fashion via the hot air flap 6 and the cold air flap 7, wherein the quantities are apportioned so that the temperature of the carrier air-coal mixture is within preselected limits after loading with finely ground coal. The temperature of the carrier air is measured with the temperature measurement device 9 arranged after the coal mill 8. The sensors of the carrier air quantity measurement device 10 are disposed before the coal mill. These sensors are constructed as measuring rods sequentially arranged in pairs in the flow direction of the carrier air and protruding into the carrier air flow. The carrier air quantity measurement device 10 is constructed as a correlation measurement device which evaluates the triboelectric effects caused at the measuring rods by the particles carried in the carrier air, thereby measuring the flow velocity of the carrier air. The quantity of carrier air is determined based on the cross-sectional area of the pipe carrying the carrier air in the region of the disposed measuring rods and the temperature of the carrier air and the static pressure of the carrier air in the region of the disposed measuring rods.

Coal is delivered to the coal mill 8 by way of a metering device 11 commensurate with the load demand from the firing system of the power plant. The carrier air loaded with ground coal is transported to the burners 13 arranged in the firing chamber 12. This can be done, depending on the construction of the firing system of the coal-fired power plant, individual for each burner or for each group of burners or jointly for all burners 13 of a firing chamber 12. A pressure measurement device 14 for measuring the static pressure of the carrier air is arranged in the flow direction of the carrier air after the regenerative air preheater 5. In addition, safety flaps 15 are arranged in the carrier air flow, which are closed during the startup phase of the firing system of the coal-fired power plant, i.e., when no ground coal is delivered to the burners 13.

The main portion of the suctioned fresh air after the fresh air blower 3 is delivered as combustion air to the regenerative air preheater 5. The static pressure of the heated combustion air is measured with a static pressure measurement device 16. The fresh air blower 3 is controlled by the pressure measurement devices 14 and 16. One part of the heated combustion air is delivered directly to the burners 13, wherein the other part is delivered to the firing chamber 12. The quantity of both parts of the combustion air is measured by the combustion air quantity measurement devices 17 and 18.

The combustion air quantity measurement devices 17 and 18 are constructed, like the carrier air quantity measurement device 10, as a correlation measurement device. The measurement devices have sensors constructed as measuring rods which are arranged sequentially in the pipe or channel system carrying the combustion air in pairs in the flow direction of the combustion air. The fine-grained particles carried in the combustion air cause on the measuring rods triboelectric effects which are evaluated with a correlation analysis. The flow velocity of the combustion is determined from the result of this evaluation, and the combustion air quantity is determined by taking into consideration the cross-sectional area of the pipe or channel system carrying the combustion air as well as a temperature of the combustion air and the static pressure of the combustion air in the region of the disposed measuring rods.

The quantity of combustion air supplied to the burners 13 and the firing chamber 12 is controlled with combustion air control flaps 19 and 20 for attaining a fuel-air ratio required for a predetermined stoichiometry of the combustion commensurate with a quantity of ground coal supplied to the burners 13 according to the load demand from the power plant firing system. Depending on the size and power output of the firing system of the coal-fired power plant, all the aforementioned assemblies and devices may be implemented multiple times and operate in parallel. For sake of clarity of the simplified block diagram, the assemblies and devices are illustrated only once. This does not affect the basic functionality of the firing system of the coal-fired power plant within the context of the invention.

Figure 2:
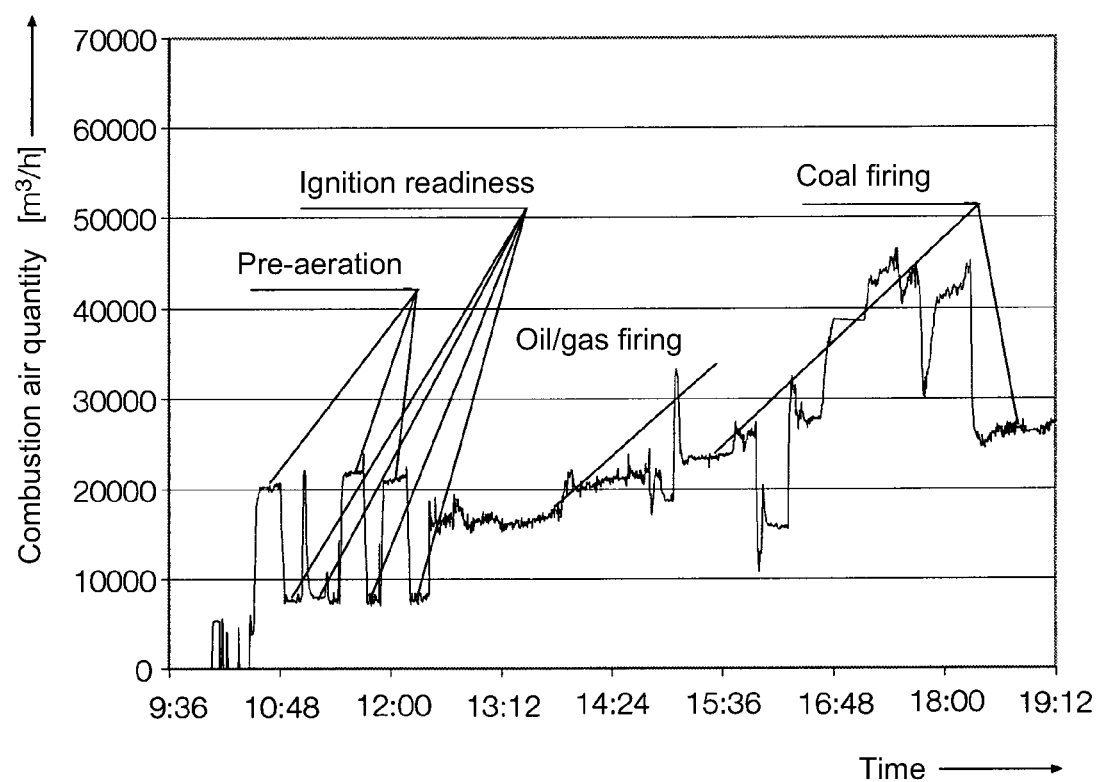

FIG. 2 shows the time dependence of the quantity of combustion air delivered to a burner 13 or a group of burners during the startup phase of a firing system of a coal-fired power plant.

First, the firing chamber 12 is pre-aerated. The combustion air control flaps 19 and 20 are fully open, while the safety flaps 15 in the carrier air duct are closed. Only combustion air is delivered to the firing chamber 12. The fresh air blower 3 is controlled depending on the pressure of the combustion air measured with the static pressure measurement device 16. Initially, sufficient combustion air is blown into the firing chamber 12 to cause multiple exchange (at least threefold) of the air quantity in the firing chamber 12, so as to remove residual fuel from the firing chamber 12 and to prevent explosions. After multiple exchange of the air quantity in the firing chamber 12, the ignition readiness for oil or gas burners arranged in the firing chamber 12 (not shown in FIG. 1) is established. When the ignition is ready, the quantity of combustion air is controlled depending on the fuel quantity supplied for the ignition process (oil or gas). 2 mg fly ash per $m^3$ of suctioned fresh air is introduced into the fresh air flow via the device 2 for the introduction of fine-grained particles into the fresh air flow. The quantity of combustion air is measured with the combustion air quantity measurement devices 17 and 18, and the quantity of combustion air supplied to the burners 13 or the firing chamber 12 is controlled via the combustion air control flaps 19 and 20. The firing system of the coal-fired power plant is fired with oil and/or gas until the firing chamber 12 and the regenerative air preheater 5 are sufficiently preheated. During the time of the oil and/or gas firing about 2 mg fly ash per $m^3$ of fresh air is introduced into the suctioned fresh air in order to cause sufficient particle loading for creating triboelectric effects at the sensors disposed in the combustion air flow, thereby enabling the measurement of the air quantity according to the correlation measurement method.

When the firing chamber 12 has being sufficiently preheated, the introduction of the ground coal into the firing chamber 12 commences. To this end, the carrier air flow is started by the mill blower 4 and by opening the safety flaps 15, and the coal mill 8 is supplied with a metered quantity of coal. The carrier air is loaded with ground coal.

The ground coal is ignited at the still operating oil and/or gas burners. When coal begins to be introduced into the firing chamber 12 and the coal combustion is ignited, the introduction of fine-grained particles into the suctioned fresh air is terminated. A sufficient quantity on ash particles is introduced into the combustion air and the carrier air via the regenerative air preheater 5 for causing triboelectric effects at the sensor rods of the air quantity measurement devices 10, 17 and 18.

LIST OF REFERENCE SYMBOLS

1 Fresh air flap
2 Device for metered introduction of fine-grained particles
3 Fresh air blower
4 Mill blower
5 Regenerative air preheater
6 Hot air flap
7 Cold air flap
8 Coal mill
9 Temperature measurement device
10 Carrier air quantity measurement device
11 Metering device for coal
12 Firing chamber
13 Burner
14 Pressure measurement device for measuring the static pressure of the carrier air
15 Safety flap
16 Pressure measurement device for measuring the static pressure of the combustion air
17 Combustion air quantity measurement device
18 Combustion air quantity measurement device
19 Combustion air control flap
20 Combustion air control flap

The invention claimed is:

1. A device for controlling, a fuel-air-ratio during combustion of ground coal in a firing system of a coal-fired power plant, comprising
 pneumatic transporting of the ground coal to a burners of the coal-fixed power plant,
 a feeder for feeding combustion air to the burners (13) or a combustion chamber (12) of the firing system of the coal-fired power plant,
 a fresh air blower (3) for suctioning fresh air from the atmosphere,
 a mill blower (4) for transporting a portion or the suctioned fresh air as carrier air for loading with ground coal,
 a regenerative air pre-heater (5) for preheating the suctioned fresh air and a portion of the carrier air by using the flue-gas heat from the firing system of the coal-fired power plant, wherein a storage mass of the regenerative air pre-heater (5) is alternatingly heated by the hot flue gas and subsequently cooled by the fresh air or by a portion of the carrier air,
 an air quantity control device for controlling the quantity of combustion air to be used for the pneumatic transport of the ground coal, and measurement devices (10, 17, 18) for measuring the quantity of combustion air introduced into the combustion chamber (12) and of the quantity of carrier air to be used for pneumatic transport of the ground coal, and of device (8, 11) for metered feed of a preselected quantity of ground coal to the burners (13), the fresh air blower, the mill blower, the regenerative air pre-heater, the air quantity control device are arranged in the flow direction of the air, and
 wherein, for measuring the combustion air (17, 18) a correlation measurement device is provided which evaluates triboelectric effects at two sensors disposed in the combustion air flow and sequentially arranged in the flow direction of the combustion air, and
 wherein the sensors are arranged in the channel system carrying the combustion air after the regenerative air pre-heater (5) in the flow direction of the combustion air and that at least one device (2) for metered introduction of fine-grained particles into the air flow is disposed before the sensors of the correlation measurement device in the flow direction of the combustion air.

2. The device according to claim 1, wherein the metered introduction of fine-grained particles are between 0.1 mg to 10 mg of fine-grained particles per $m^3$ of air with a particle diameter between 20 µm to 200 µm.

3. The device according to claim 2, wherein the metered introduction of fine-grained particles are between 0.5 mg to 2 mg, of fine-grained particles per $m^3$ of air with a particle diameter between 60 µm to 90 µm.

4. The device according to claim 1, wherein for measuring the carrier air (10), a correlation measurement device is provided which evaluates triboelectric effects at two sensors arranged sequentially in the carrier air flow in the flow direction of the carrier air, wherein the sensors are arranged in the channel system carrying, the carrier air after the regenerative air pre-heater (5) in the flow direction of the carrier air.

5. The device according to claim 1, wherein the device (2) for metered introduction of fine-grained particles into the air flow is arranged before the fresh air blower (3).

6. The device according to claim 1, wherein the device (2) for metered introduction of fine-grained particles into the air flow is a dust injector.

7. The device according to claim 1, wherein the sensors for sensing triboelectric effects in the combustion air flow are arranged before the actuator (19, 29) for controlling the quantity of combustion air and in the carrier air flow before the introduction of the ground coal into the carrier air flow.

8. The device according to claim 6, wherein the dust injector is constructed for introduction of filter ash or fly ash into the air flow.

9. The device according to claim 1, wherein the sensors for sensing triboelectric effects are arranged in the region of a channel constriction or a channel curvature of an air channel.

* * * * *